(12) United States Patent
McAllister et al.

(10) Patent No.: US 11,673,018 B2
(45) Date of Patent: Jun. 13, 2023

(54) INDOOR BICYCLE STEERING STEM

(71) Applicant: Daniel J. McAllister, Woodstock, GA (US)

(72) Inventors: Daniel J. McAllister, Woodstock, GA (US); Dale Seeley, Marietta, GA (US)

(73) Assignee: Daniel McAllister, Woodstock, GA (US)

( * ) Notice: Subject to any disclaimer, the term of this patent is extended or adjusted under 35 U.S.C. 154(b) by 95 days.

(21) Appl. No.: 17/134,574

(22) Filed: Dec. 28, 2020

(65) Prior Publication Data

US 2022/0047912 A1   Feb. 17, 2022

Related U.S. Application Data

(60) Provisional application No. 63/066,373, filed on Aug. 17, 2020.

(51) Int. Cl.
*B62K 21/12* (2006.01)
*A63B 21/00* (2006.01)
*A63B 22/06* (2006.01)

(52) U.S. Cl.
CPC ...... *A63B 21/4035* (2015.10); *A63B 22/0605* (2013.01); *B62K 21/12* (2013.01)

(58) Field of Classification Search
CPC ........ B62K 21/12; B62K 21/16; B62K 21/18; B62K 21/22; B62K 21/24; B62K 21/06;
(Continued)

(56) References Cited

U.S. PATENT DOCUMENTS 6,126,571 A    10/2000  Parks
6,186,027 B1 *  2/2001  Nielsen ................. B62K 21/18
                                                    403/365
(Continued)

FOREIGN PATENT DOCUMENTS

EP    1214957 A1    6/2002
EP    1754520 A1    2/2007
(Continued)

OTHER PUBLICATIONS

"Plain bearing," Wikipedia Page, dated by Wayback Machine to Jan. 8, 2020, url:<https://web.archive.org/web/20200108094411/https://en.wikipedia.org/wiki/Plain_bearing>.*
(Continued)

*Primary Examiner* — Brian J McGovern
(74) *Attorney, Agent, or Firm* — Hanrahan Law Firm, P.A.; Benjamin M. Hanrahan (57) ABSTRACT

A replacement bicycle stem is disclosed herein. In particular, prior to operation of a bicycle in a stationary environment, the bicycle stem, if present, is removed and replaced with the replacement bicycle stem disclosed herein. The replacement bicycle stem is intended to rotate or turn with the handlebars, but independent of the steer tube and front wheel. More specifically, the replacement stem includes a main body with a mounting channel at one end and a handlebar clamp at another end. At least one bearing is disposed within a portion of the mounting channel for engagement against the steer tube. The at least one bearing allows or facilitates rotation of the stem about the steer axis independent of or substantially independent of the steer tube.

18 Claims, 10 Drawing Sheets

(58) Field of Classification Search
CPC .............. A63B 69/16; A63B 2069/161; A63B 2069/162; A63B 2069/163
See application file for complete search history.

(56) References Cited

U.S. PATENT DOCUMENTS

| | | | |
|---|---|---|---|
| 7,226,395 | B2 | 6/2007 | Wu et al. |
| 7,963,889 | B2 | 6/2011 | Badarneh et al. |
| 8,181,980 | B1* | 5/2012 | Moore .................... B62K 21/18 |
| | | | 280/279 |
| 2002/0055422 | A1 | 5/2002 | Airmet et al. |
| 2003/0189307 | A1* | 10/2003 | Tange .................... B62K 21/06 |
| | | | 280/279 |
| 2006/0096408 | A1* | 5/2006 | Liao ........................ B62K 21/16 |
| | | | 74/551.1 |
| 2006/0130605 | A1* | 6/2006 | Chen ........................ B62K 21/12 |
| | | | 74/551.1 |
| 2007/0105694 | A1 | 5/2007 | Panatta |
| 2007/0170690 | A1* | 7/2007 | Hermansen .............. B62K 1/00 |
| | | | 280/280 |
| 2008/0029993 | A1* | 2/2008 | Callahan ................ B62K 21/06 |
| | | | 280/280 |
| 2008/0269025 | A1 | 10/2008 | Badarneh et al. |
| 2009/0079160 | A1* | 3/2009 | Lai .......................... B62K 21/16 |
| | | | 280/279 |
| 2009/0096185 | A1* | 4/2009 | Wu .......................... B62K 21/16 |
| | | | 280/279 |
| 2009/0283648 | A1 | 11/2009 | Chiang et al. |
| 2011/0121537 | A1* | 5/2011 | Lin .......................... B62K 21/18 |
| | | | 280/279 |
| 2012/0193888 | A1* | 8/2012 | Chen ........................ B62J 50/40 |
| | | | 280/279 |
| 2013/0026729 | A1* | 1/2013 | King ....................... B62K 21/18 |
| | | | 280/270 |
| 2013/0157813 | A1 | 6/2013 | Irving et al. |
| 2015/0047455 | A1* | 2/2015 | Alstrin .................... B62K 21/18 |
| | | | 74/492 |
| 2015/0290490 | A1 | 10/2015 | Badarneh |
| 2017/0136293 | A1 | 5/2017 | Caccia |
| 2018/0326255 | A1* | 11/2018 | Schranz ................. A63B 21/08 |
| 2018/0369675 | A1 | 12/2018 | Papadopoulos |
| 2020/0339214 | A1* | 10/2020 | Duong ...................... B62K 5/06 |
| 2021/0061399 | A1* | 3/2021 | Juban ...................... B62K 21/12 |
| 2021/0362798 | A1* | 11/2021 | Robinson ............... B62K 21/06 |

FOREIGN PATENT DOCUMENTS

| | | |
|---|---|---|
| EP | 2181741 A1 | 5/2010 |
| KR | 101937243 B1 | 1/2019 |
| NL | 2006702 C2 | 11/2012 |
| WO | 2005046806 A2 | 5/2005 |

OTHER PUBLICATIONS

PCT International Search Report, for Patent Cooperation Treaty (PCT) Application No. PCT/US2021/46212 filed on Aug. 17, 2021, dated Nov. 9, 2021 (2 pages).

Written Opinion of the International Searching Authority, for Patent Cooperation Treaty (PCT) Application No. PCT/US2021/46212 filed on Aug. 17, 2021, dated Nov. 9, 2021 (6 pages).

Reddit.com | "My Zwift Steering Build" |dated Oct. 2019 |website located at: https://www.reddit.com/r/Zwift/comments/deaa0r/my_zwift_steering_build/ |26 pages |pp. 1-16, printed on Jan. 29, 2020, pp. 17-26, printed on Jul. 17, 2021.

Schlange, Eric, "Setting Up Your Front Wheel and Phone for Zwift Steering" |Zwift Insider |dated Oct. 2, 2019 |website located at: https://zwiftinsider.com/setting-up-your-bike-and-phone-for-swift-steering/ |9 pages, printed on Jan. 29, 2020.

* cited by examiner

INDOOR BICYCLE STEERING STEM

CLAIM OF PRIORITY/CROSS-REFERENCE TO RELATED APPLICATION

The present application is based on and a claim of priority is made under 35 U.S.C. § 119(e) to provisional patent application Ser. No. 63/066,373, filed on Aug. 17, 2020, the contents of which are incorporated herein in their entirety by reference.

FIELD OF THE INVENTION

The present invention is generally directed to a replacement stem for a bicycle, and more specifically, a replacement stem for a bicycle operated in a stationary or substantially stationary fashion, such as with a trainer, smart trainer, virtual reality or simulation game or application, etc.

BACKGROUND OF THE INVENTION

Stationary cycling is a low-impact or in some cases no-impact workout that has been around for many years. Historically, stationary cycling involves the use of a complete, stand-alone special-purpose exercise machine that resembles a bicycle, but does not have functional wheels that an ordinary bicycle would have. Instead, the exercise machine, often referred to as a "spin bike," may include a saddle or seat, pedals, and a form of handlebars arranged such that the exerciser is seated in a position similar to that of an ordinary bicycle rider. In some cases, weighted or magnetic resistance mechanisms are built into the exercise machine.

In other instances, an ordinary bicycle can be adapted to function as a stationary bicycle by mounting or securing the bicycle to a fixture such as, but not limited to, a bicycle roller, stand or "trainer." Bicycle trainers are often referred to as devices to which the rear portion of the bicycle (e.g., the rear wheel, rear hub, rear portion of the frame, rear frame forks, etc.) mounts and in some cases can provide resistance to the bicycle during use. In this manner, rollers, stands or trainers can be used by cyclists to warm up before a race or by virtually any user or exerciser in his or her own home to convert an ordinary or operable bicycle into a stationary mounted bicycle or exercise machine. In some cases, the rear wheel of an ordinary or operable bicycle may be removed in order to attach or mount the bicycle (e.g., at the rear hubs) to the stand or trainer. Accordingly, some rollers, stands and/or trainers allow the rider or user to pedal an ordinary bicycle (sometimes, but not always, with the rear wheel removed) to feel resistance based on the internal settings of the trainer or other fixture.

Riding a bicycle on a trainer or other like fixture historically is often described as a miserable, painful, lonely, and mind-numbing experience. That, however, has rapidly changed in recent years. As an example, some trainer manufacturers have developed "Smart Trainers," which are trainers that can be connected to an application or device, either wirelessly or wired, that can control the resistance applied to the rear wheel or pedals of the bicycle. The application or device can then provide workout simulations of various types to help the rider achieve various or desired fitness goals. Although a potential improvement, the "Smart Trainers" are still described as being boring or mind-numbing, since the rider will often be staring at a blank wall or in some cases, trying to pass time by watching television or other unrelated multimedia broadcast.

Recently however, advances in technology have made stationary cycling much more engaging and interactive. For instance, using the Internet or other network, riders and users can interact with an instructor, and pit themselves against other people from around the World. In addition, there is at least one known virtual reality cycling system—ZWIFT®—which is an Internet-based subscriber-paid virtual reality game. More in particular, a user is able to connect his or her smart trainer to the ZWIFT® game or system to participate in a realistic, engaging and more enjoyable experience while riding indoors. The ZWIFT® game has real three-dimensionally GPS mapped courses of a number of real cities on Earth, and at least one fictitious island known as "Watopia" in the Pacific Ocean. The graphics are compelling and an online community of at least 1.1 million subscribers exists at this filing.

Furthermore, the ZWIFT® game requires the rider to physically engage in a similar manner as he or she would have to while riding in the "real world," with two exceptions—1. there are no brakes implemented in the ZWIFT® game, and 2. the user does not steer the bicycle.

In December of 2019, ZWIFT® released the first crude versions of a "steering course" for virtual mountain bike use. With the advent of a rider-steered course in a stationary environment came the need for a device that has not yet existed, and had not yet been imagined.

It should be noted that virtually all "steered" vehicles or devices, such a bicycles, have some form of self-aligning and stabilizing geometry to the steering system known as "trail." Trail is defined as the horizontal distance the contact patch of a steered wheel falls behind an imaginary line drawn through the steering axis to the ground. In other words, trail is defined as the distance where the steered wheel (e.g., the front wheel on a bicycle) touches the ground to where the steering axis intersects the ground. The steering axis is a straight-lined axis drawn through the steering tube of the bicycle to intersect the ground at a head angle. The trail of a standard bicycle with both wheels on the ground can be increased by increasing the front wheel size, increasing the head angle, or decreasing the fork offset. Similarly, trail of a standard bicycle with both wheels on the ground can be decreased by decreasing the head angle, increasing the fork offset, or decreasing the front wheel diameter.

As an example, a shopping cart caster wheel works due to the trail. For instance, regardless of which direction the wheel is pointed, when the cart is pushed forward, the caster wheel will automatically spin around to the rear and align itself in the direction of travel. This is because of the trail incorporated into the caster wheel.

Bicycles also incorporate trail into the design, which helps with stabilization and steering of the bicycle during use or operation. Without trail, the bicycle would wobble, shake violently, and most likely throw the rider off.

Trail is virtually imperceptible to the rider in a normal outdoor environment where the bicycle is free to roll or travel down the road. However, in a stationary cycling environment, where the rear of the bicycle is generally fixed or mounted to a device (e.g., a stand) to hold it locked in place, the steering system is rendered dysfunctional.

For example, while it is often perceived that the front wheel of a bicycle turns on the contact patch of the tire, as explained by trail, it is not. There is a "lever" following behind the true steering pivot. In order for the front wheel to turn in this environment, it must be free to move on the ground in the form of an arc, which it clearly cannot do. For reference, the arc would appear as a "Smile" or a "U" when viewed from the handlebars looking down at the front wheel.

If a rider were to try and force the front wheel to turn on the ground, the front fork and suspension (if so equipped, i.e., a mountain bike) will be forced to twist resulting in possible damage. Once the parts have been twisted to the point that they can overcome the rubber of the tire holding the wheel to the ground, the tire will then begin to slide on the ground in the prescribed arc. Dragging the tire on the ground will damage both the tire and the floor in use by the rider.

Reversing the steering and trying to find "straight" is the next problem. It will require a secondary resistance and fight from the bicycle against the rider's wishes.

The problem becomes amplified in the realm of virtual cycling when the trail of the stationary or mounted bicycle varies during use. For example, in some instances, the bicycle can be mounted to a front mounting device, which can, but does not necessarily need to allow for an adjustment or change in the gradient of the bicycle by raising and lowering the front end of the mounted bicycle. Accordingly, as used herein, the terms "elevator" or "gradient adjustment device" refers to a device or assembly on which the front of the bicycle is attached and which can be used to adjust or change the height of the front end of the bicycle, and therefore, the gradient or angle of the mounted bicycle relative to the ground or support surface. It should be noted that, in some cases, the front wheel of the mounted bicycle is removed and the front forks of the bicycle are secured to the elevator, gradient adjustment device or other front end mounting device. In other cases, the front wheel may remain on the mounted bicycle while the mounted bicycle or wheel is attached or secured to elevator or other device.

In any event, the elevator or other like gradient adjustment device is designed to raise and lower the front end of the bicycle as the virtual game or system moves through the three-dimensional maps or courses. Raising the front end of the mounted bicycle from its normal, level orientation (while maintaining the rear end of the bicycle substantially in place) is designed to simulate the rider traveling uphill or up a slope; whereas lowering the front end of the bicycle from its normal, level orientation (while maintaining the rear end of the bicycle substantially in place) is designed to simulate the rider travelling downhill, or down a slope.

Presently, there is one such company with an elevator device or gradient adjustment device—WAHOO FITNESS® has a device called the KICKR® Climb, which can simulate gradients from 0 to +20% by raising the front of the bicycle, and gradients from 0 to −10% by lowering the front of the bicycle.

Ordinary bicycles typically have around 2 to 2.5 inches of trail when ridden down the road. However, when the front end of the bicycle is raised, for example, by an elevator device, while the rear end of the bicycle remains in the same or generally the same position or orientation, for instance, when the rear wheel or rear of the bicycle is mounted to a fixture, the trail is dramatically increased. Similarly, when the front end of the bicycle is lowered, for example, by an elevator device, while the rear end of the bicycle remains in the same or generally the same position or orientation, the trail is dramatically decreased.

For instance, if the steering axis angle (e.g., the angle between the steering axis and a vertical plane extending from the center of the front hub to the ground) is decreased, the trail is also decreased. Similarly, if the front end of the bicycle is lowered, the trail also decreases. Alternatively, lifting or raising the front end of the bicycle and/or increasing the steering axis angle increases the trail, usually in a significant manner.

As an example, a bicycle mounted to or on an elevator device that raises the front end of the bicycle to a gradient of +15% can have as much as 10 inches of trail (which may be an increase of about 8 inches of trail). Attempting to turn the handlebars (with force) at such an angle with such a high trail, will cause the entire assembly, e.g., the elevator device and the mounted bicycle, to tip over and possibly injure or kill the rider. Accordingly, this makes it impossible for any rider to experience a steering environment using an elevator or other gradient adjustment device as presently constructed.

Further, as the front of the bicycle is lowered, the front wheel will come closer to the rear wheel reducing the wheelbase. The converse is also true. Raising the front of the bike will increase the wheelbase of the bike. A mechanism must be made to compensate for this movement, which again can be several inches.

Since many virtual courses will be dedicated to bicycles with suspension systems on them like mountain bikes have, these also require a forward and backward moving component. Compressing the suspension system while pedaling or bouncing on the pedals (with force) will cause the wheelbase to shorten. When the suspension extends, the wheelbase will get longer. This must be compensated for.

Further adding to the complexity required for a cycle training experience is a new device called a "Rocker Plate". A rocker plate is a device that the trainer, and sometimes even the entire bike, is placed on. The rocker plate will allow the bicycle to rock or toggle from side to side in order to simulate the actual rocking action of a bicycle going down the road, which greatly reduces saddle pain and fatigue for the cyclist.

Accordingly, there is a need in the art for a solution to the steering problem described above in relation to stationary cycling or indoor cycling with the use of a rear mount, trainer, fixture or an elevator/gradient adjustment device.

SUMMARY OF THE INVENTION

Accordingly, the present invention is generally directed to a stem assembly that minimizes movement of the front wheel even when the handlebars are rotated or pivoted. More in particular, the stem assembly rotates about the bicycle's steering axis with little or no resistance in order to accept instantaneous rider input.

In particular, the user may first remove the existing stem, if present, from the bicycle and replace it with the stem assembly of the present invention without any additional modification to the bike. For example, in one embodiment, with the existing stem removed from the bicycle and the top end of the steer tube exposed or accessible, the stem assembly of the present invention will slide or fit over and around the existing steer tube.

At least one embodiment of the stem assembly of the present invention includes one or more internally mounted bearings that will allow the handlebars, controls, and stem to swivel freely with little or no resistance around the bicycle's steer tube or steering axis without inducing force that would try to turn or move the front wheel.

Furthermore, the stem assembly of at least one embodiment will appear like any traditional bicycle stem, and may include a handlebar attachment assembly, such as a split-cap design, to hold the handlebars with four clamping bolts. Other configurations are contemplated within the full spirit and scope of the present invention.

The height, size and/or dimensions of the stem assembly can be designed such that it takes the place of an ordinary stem without any modification to the bicycle itself. In some cases, the stem assembly can be made in an array of different lengths and angles so that the user or rider has a precise fit, without any sacrifice in comfort.

In some embodiments, the stem assembly will not clamp onto or secure to the steer tube in any manner, which will then allow the stem assembly to swivel about the about the steering axis of the bicycle. In order to prevent any possibility of the front wheel moving unintentionally, a stabilizing device, including but not limited to a wide VELCRO® strap, can be passed through the front wheel, up and over the down tube or other portion of the bike frame and back to itself to hold the wheel in a front-facing orientation or other constant position.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
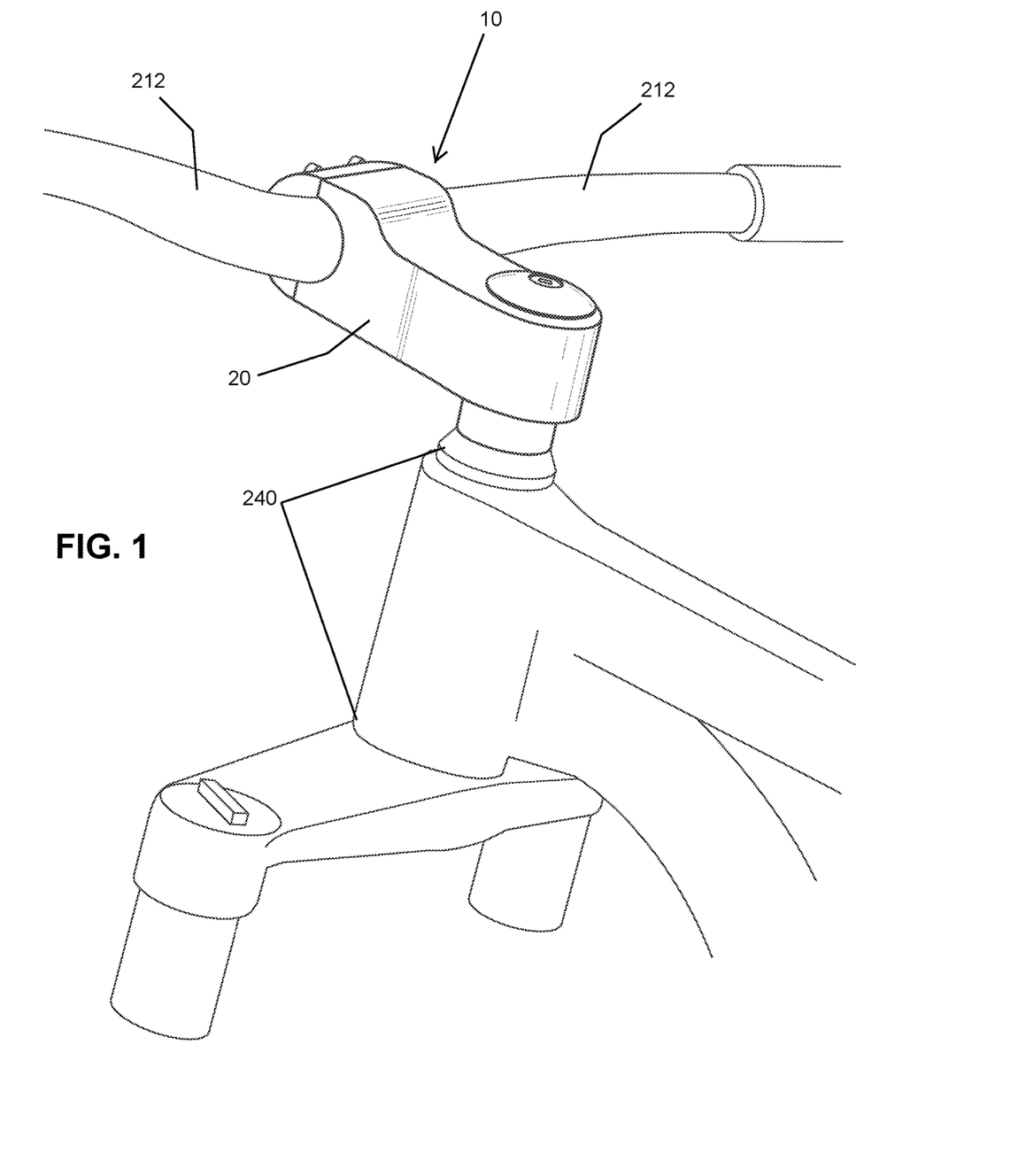
FIG. 1 is a partial perspective view of a bicycle with the stem assembly as disclosed in at least one embodiment of the present invention installed thereon.

As shown in the accompanying drawings, and with particular reference to FIG. 1, the present invention is directed to a bicycle stem or bicycle stem assembly, generally referenced as 10, which can be installed or mounted on a bicycle 200, and in particular, a bicycle 200 used in connection with stationary or indoor cycling. More in particular, in order to install the bicycle stem assembly 10 of at least one embodiment of the present invention onto the bicycle 200, the current stem 230 of the bicycle, if present, must first be removed. As is described further herein, the bicycle stem assembly 10 of the present invention can be considered a replacement stem and is structured to rotate independent of, or substantially independent of, the bicycle steer tube 220. More specifically, once properly installed on the bicycle 200, rotation of the handlebars 212 will cause the stem assembly 10 to rotate, however, since the stem assembly 10 rotates independent of, or substantially independent of, the steer tube 220, little or no rotation is imparted to the steer tube 220 or front wheel.

In this manner, a user or rider is able to rotate the handlebars 212 to simulate steering the bicycle 200, for example, during operation of a bicycle simulation or virtual reality game or system, including but in no way limited to ZWIFT®, without any or without substantial movement or rotation of the front wheel. This eliminates many, if not all, of the problems outlined herein with regard to trail, which is often exacerbated with the use of rockers, elevators, gradient adjustment devices, and other like machines or devices.

It should also be noted that in some embodiments, one or more angle sensors, accelerometers, gyroscopes, or other mechanical or electrical devices can be incorporated into or communicative with the stem assembly 10 of the present invention in order to determine or calculate the angle or amount of rotation that is imparted onto the handlebars or stem assembly 10. The information or data obtained or calculated thereby can then be communicated to the bicycle simulation or virtual reality game or system during operation thereof. The game or system can then determine what, if anything, to do with the information, for example, by modifying the display screen and/or direction of the bicycle represented in the game or system.

Figure 2A:
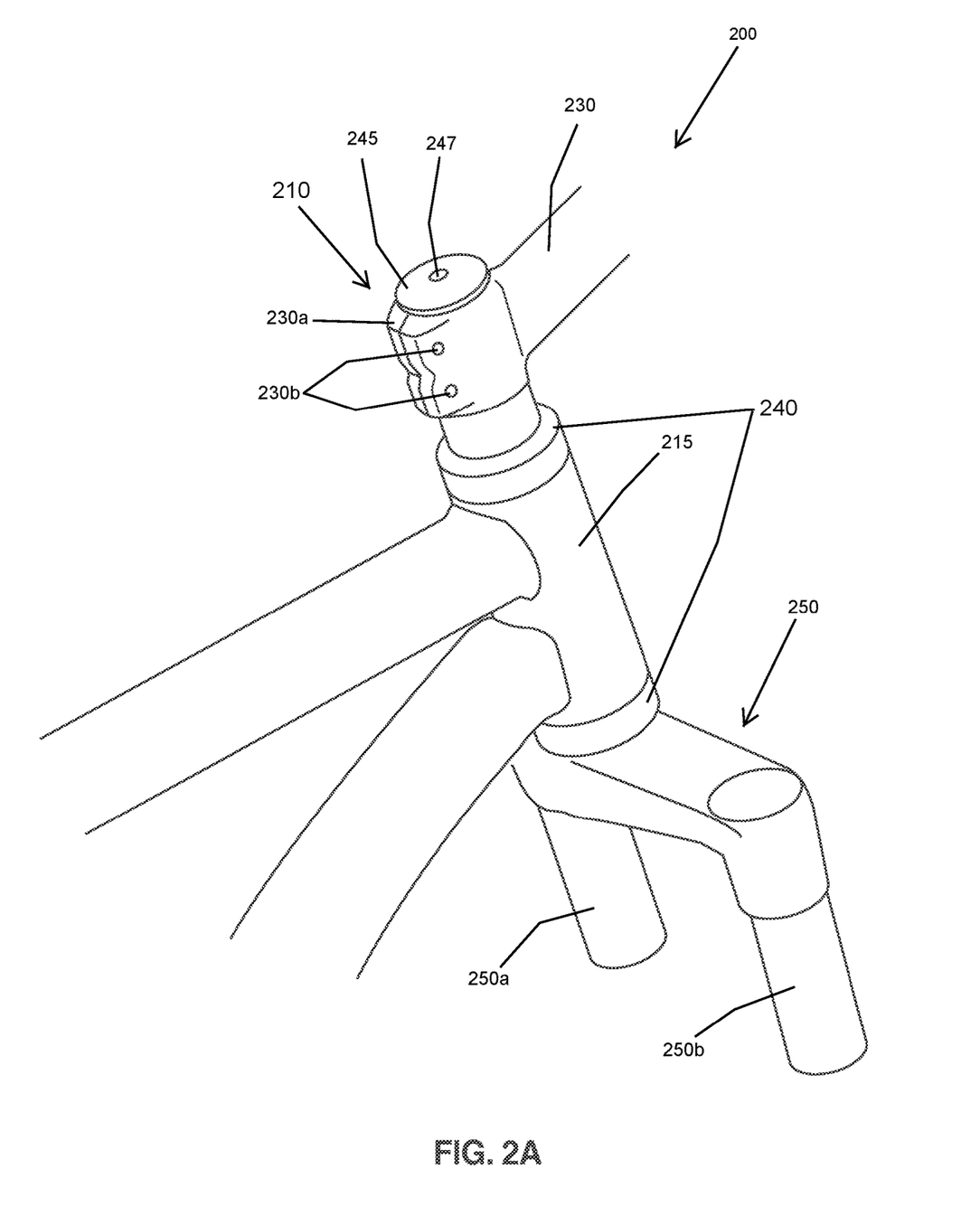
FIG. 2A is a partial perspective view of a prior art bicycle illustrating the stem and other components thereof.
Figure 2B:
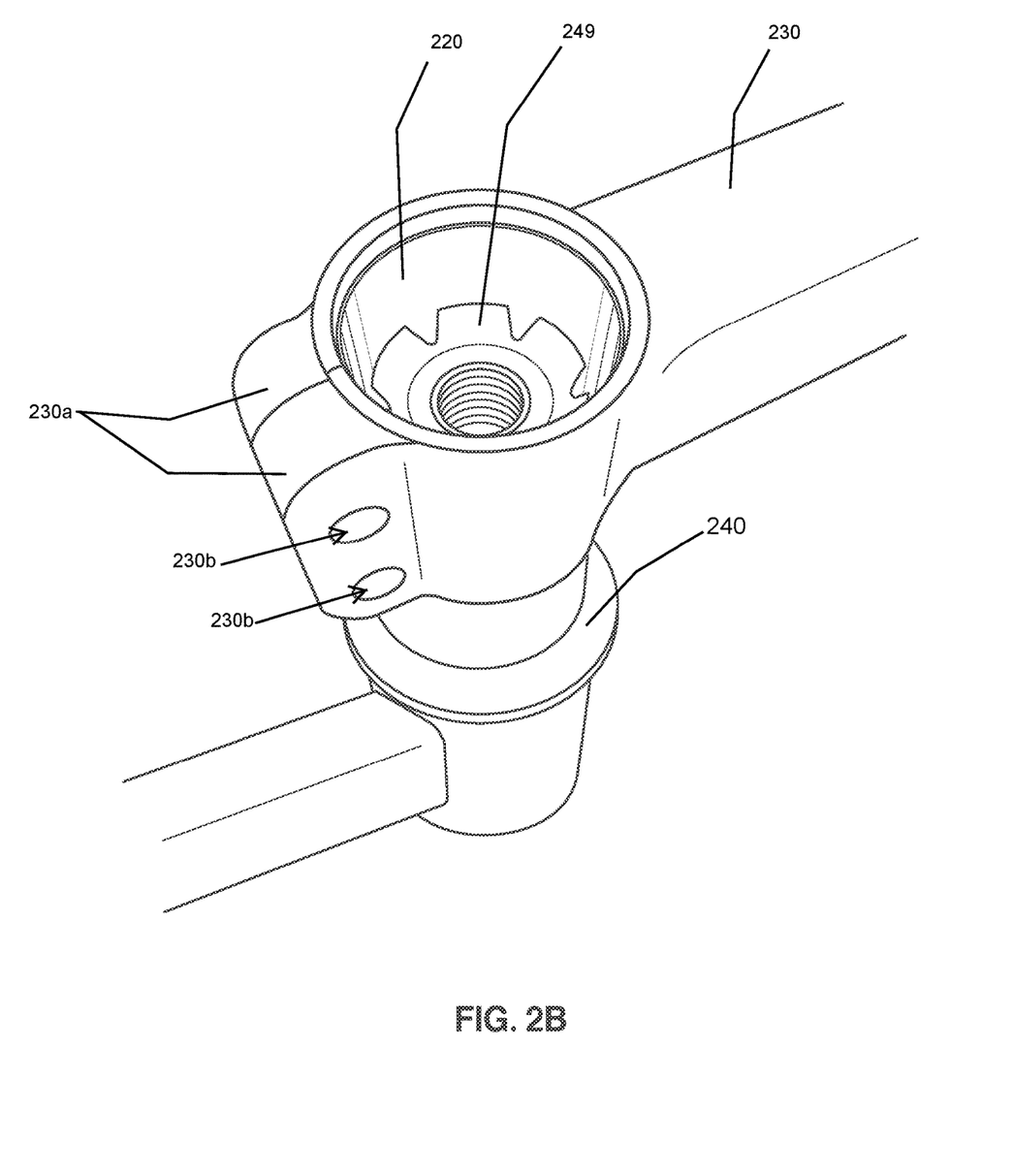
FIG. 2B is another partial perspective view of a prior art bicycle illustrating the stem, steer tube, and other components thereof.

Furthermore, FIGS. 2A and 2B, presented herein, illustrate a portion of representative bicycle 200 and a typical or representative bicycle stem 230. In particular, most bicycles include a similar or comparable steering assembly 210, which, as used herein, includes a series of components or structures that facilitate the steering of the bicycle 200 in a typical setting (e.g., outdoor riding) via rotation or pivoting of the handlebars 212. More in particular, the steering assembly 210 of the bicycle 200 may include a steering tube 220, a stem 230 and a headset 240.

More specifically, the steering tube 220 of the bicycle 200 generally attaches at one end to a fork 250, which includes arms 250*a*, 250*b* that extend down and attach to opposite sides of the front wheel (not shown) of the bicycle 200. The steering tube 220 extends up into and in many cases through a head tube 215, which is a fixed portion of the bicycle frame. The stem 230 is the component on the bicycle 200 which connects the handlebars 212 to the steering tube 220, such that rotation or pivoting of the handlebars 212 translates to rotation or pivoting of the steering tube 220. In the example shown, the stem 230 is secured or fixed to the steering tube 220 via a clamp 230*a* and corresponding fasteners 230*b*, as shown in FIG. 2A, for example. Of course, other bicycles 200 may have different stems and a different connection mechanism between the stem 230 and the steering tube 220.

Furthermore, the headset 240, as used herein, is a set of components or structures of the bicycle 200 which provides a rotatable interface between the steering tube 220 and the fixed head tube 215 of the frame. There are a number of different types of headsets that differ from one another based on the way in which bearing(s) are held in place or by where the bearings are located (e.g., inside or outside of the head tube 215). In the illustrated example of FIGS. 2A and 2B, a "threadless" headset is illustrated, although it should be noted that the stem assembly 10 of the various embodiments of the present invention may mount to bicycles with other types of headsets, including, for example, threaded headsets.

In any event, the headset 240 in the illustrated example includes a number of components such as a top cap 245 mounted to the stem 230 and/or steering tube 220 via a top cap fastener 247 that interconnects the top cap 245 to an anchor 249. The anchor 249, as shown in FIG. 2B, is a star nut that engages the steering tube 220 by gripping the inside of the steering tube 220 with downward force. Of course, other anchors can be implemented or included as part of the bicycle head set 240. Tightening or loosening the fastener 247 (such as a bolt or screw) can adjust the tightness of the head set 240.

Figure 2C:
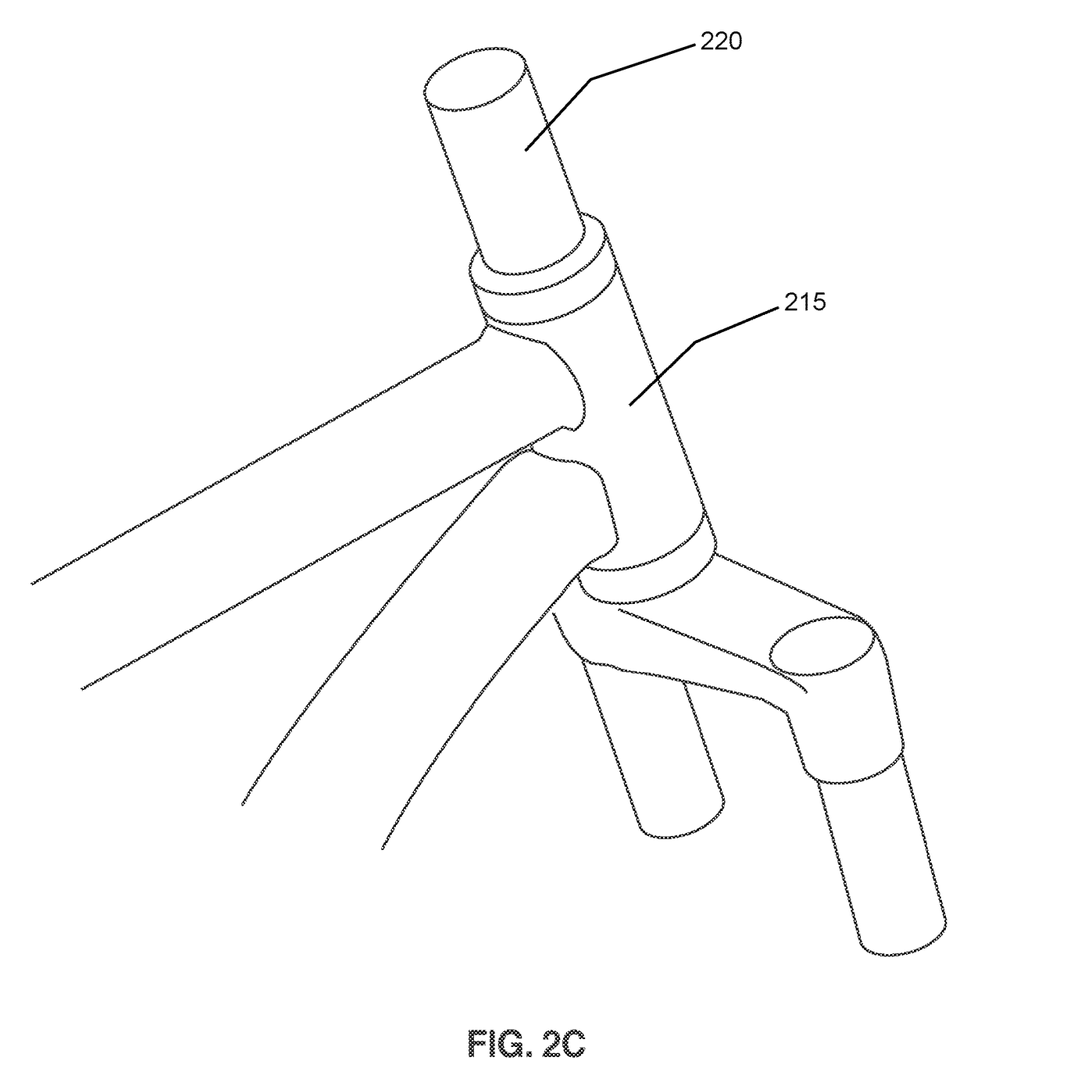
FIG. 2C is a partial perspective view of the bicycle with the stem removed and an upper portion of the steer tube exposed.

Moreover, operation of the stem assembly 10 of at least one embodiment of the present invention includes removal of the existing stem 230 from the bicycle 200, and for example, from the steer tube 220. In the example shown in FIGS. 2A and 2B, this can be accomplished by loosening or removing fasteners 230a, 230b from the stem 230 and removing the stem 230 from the bicycle 200. In some cases, removal of the top cap 245 may also be necessary prior to removal of the stem 230. Of course, this is just an exemplary stem 230 and an exemplary bicycle 200 in that other stems 230 may be removed in a different manner. In some cases, if the stem 230 is already removed or if the bicycle 200 is, for some reason, not equipped with a stem 230, then removal of an existing stem 230 may not be necessary. As an example, FIG. 2C is provided to illustrate the existing stem removed and the top portion of the steer tube 220 exposed.

Next, with the existing stem 230 removed or otherwise with the top portion of the steer tube 220 exposed, the stem assembly 10 of the present invention can be installed. For example, in one embodiment, the stem assembly 10 can slide axially onto to the steer tube 220 such that the stem assembly 10 will fit over and around the top portion of the existing steer tube 220. In some cases, the stem assembly 10 of the present invention may be manufactured or constructed in different sizes (e.g., diameters of the steer tube or mounting channel), lengths, angles, etc. to accommodate different sized riders and bicycles.

Furthermore, the steer assembly 10 of the present invention may be equipped with or include handlebars which may be secured to a handlebar clamp or attachment portion 30 of the stem 10. The handlebars may be fixed to the stem assembly 10 or, in many embodiments, removable and replaceable. In other embodiments or examples, and if desired, the handlebars 212 from the bicycle 200 can be installed onto the stem assembly 10, and in particular, within the handlebar clamp 30.

More specifically, with reference now to FIGS. 3A-3D, 4A, 4B and 5, at least one embodiment of the stem assembly 10 of the present invention is illustrated. For instance, the stem assembly 10 of at least one embodiment includes a main body 20 which defines a steer tube channel or mounting channel 25 structured to be disposed upon and at least partially surround a section of the steer tube 220. In the embodiment shown, the steer tube channel or mounting channel 25 is disposed at or proximate to a longitudinal end of the main body 20, although other locations are contemplated.

Furthermore, in some embodiments, the main body 20 also includes a handlebar attachment assembly or clamp 30, for example disposed at or proximate an opposite longitudinal end of the main body 20. In other words, in one embodiment, the steer tube channel or mounting channel 25 is disposed at or proximate to a first longitudinal end of the main body 20, while the handlebar attachment assembly or clamp 30 is disposed at or proximate to an opposite longitudinal end of the main body 20, although other locations of the channel 25 and clamp 30 upon the main body 20 are contemplated.

In any event, the handlebar attachment assembly or clamp 30 is structured to retain or secure one or more handlebar components 212 therein. In the illustrated example, the handlebar attachment assembly 30 includes a first section 32 fixed to or integral with the main body 20 and a second section 34 at least partially or fully (as shown) removable from the main body 20. The first and second sections 32, 34 of the handlebar attachment assembly define an internal channel or receiving area 35 within which the handlebars 212 are secured. As an example, the first section 32 of one embodiment may define a first concave curvature, while the second section 34 defines a second concave curvature. When the first and second sections 32, 34 are connected to one another, for example, via one or more fasteners 36 (e.g., one or more screws, bolts, pins, etc.) the first concave curvature and the second concave curvature define the opening or channel 35.

Figure 3A:
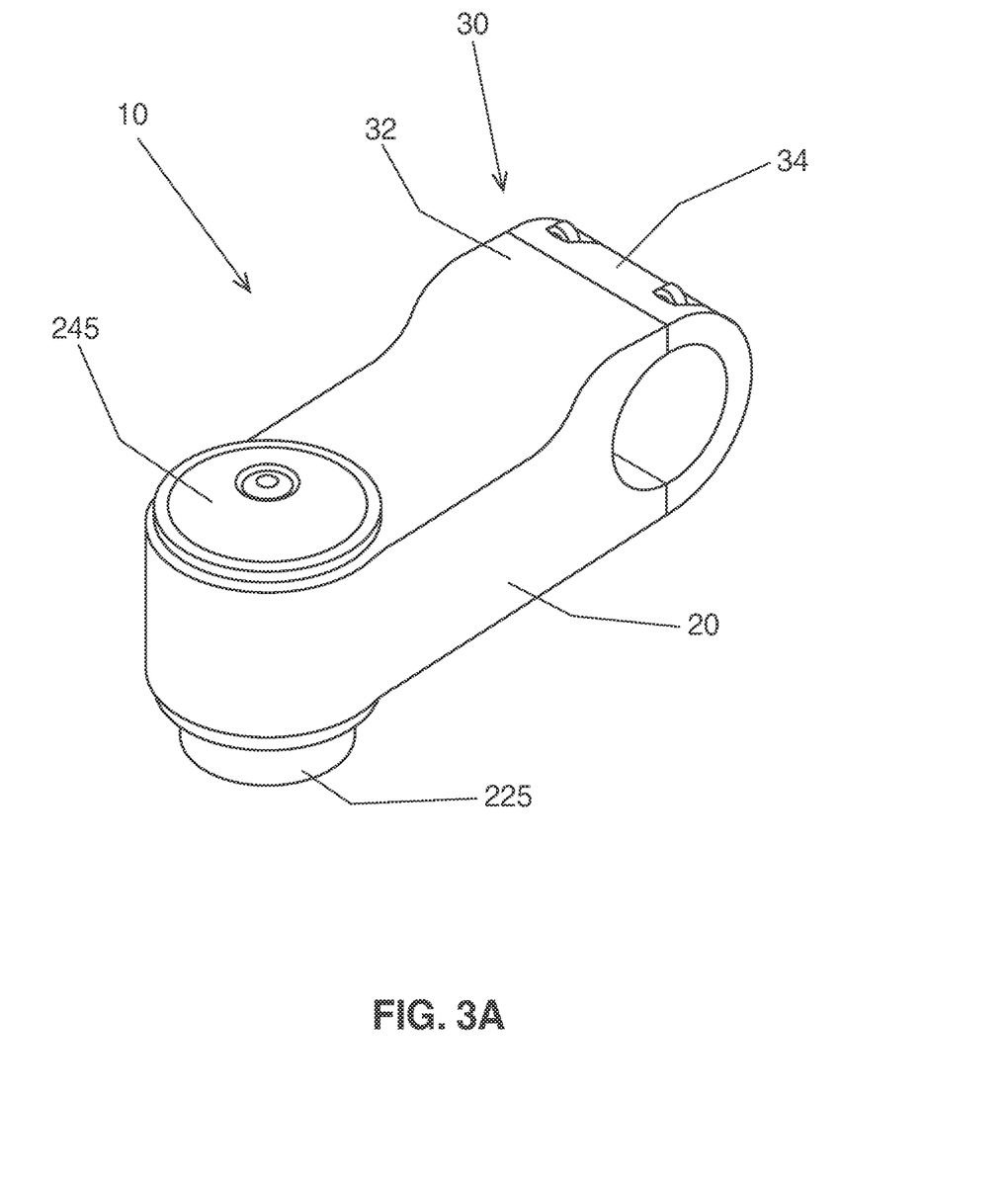
FIG. 3A is a perspective view of the stem assembly as disclosed in accordance with at least one embodiment of the present invention.
Figure 3B:
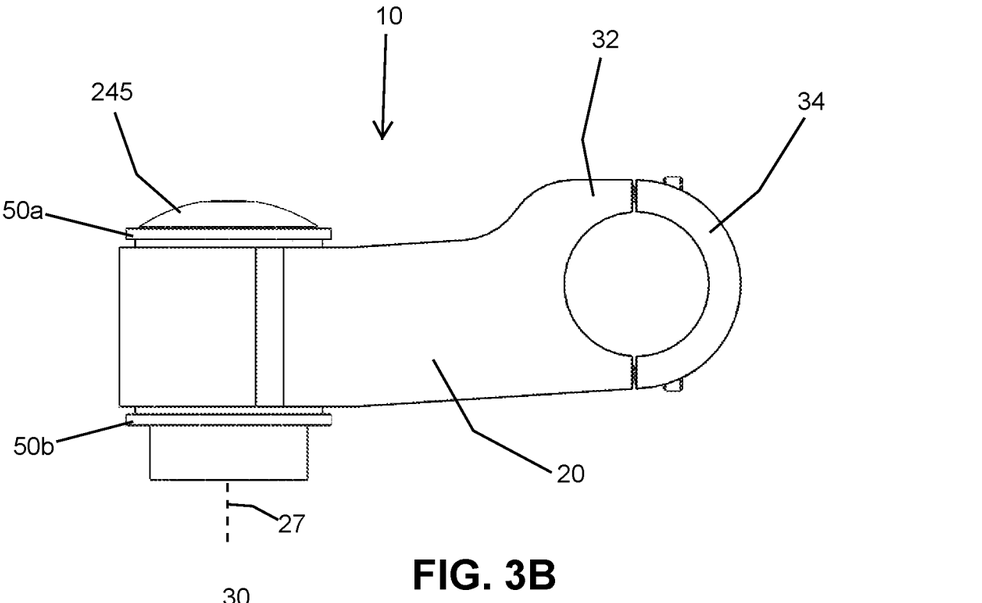
FIG. 3B is a side view of the stem assembly as disclosed in accordance with at least one embodiment of the present invention.
Figure 3C:
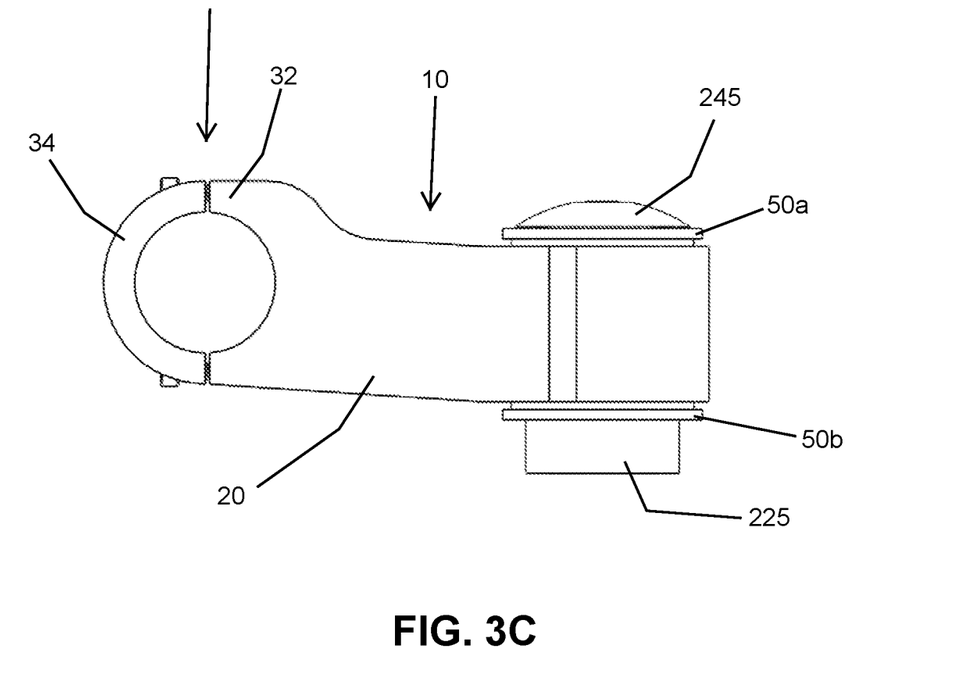
FIG. 3C is another side view of the stem assembly as disclosed in accordance with at least one embodiment of the present invention.
Figure 3D:
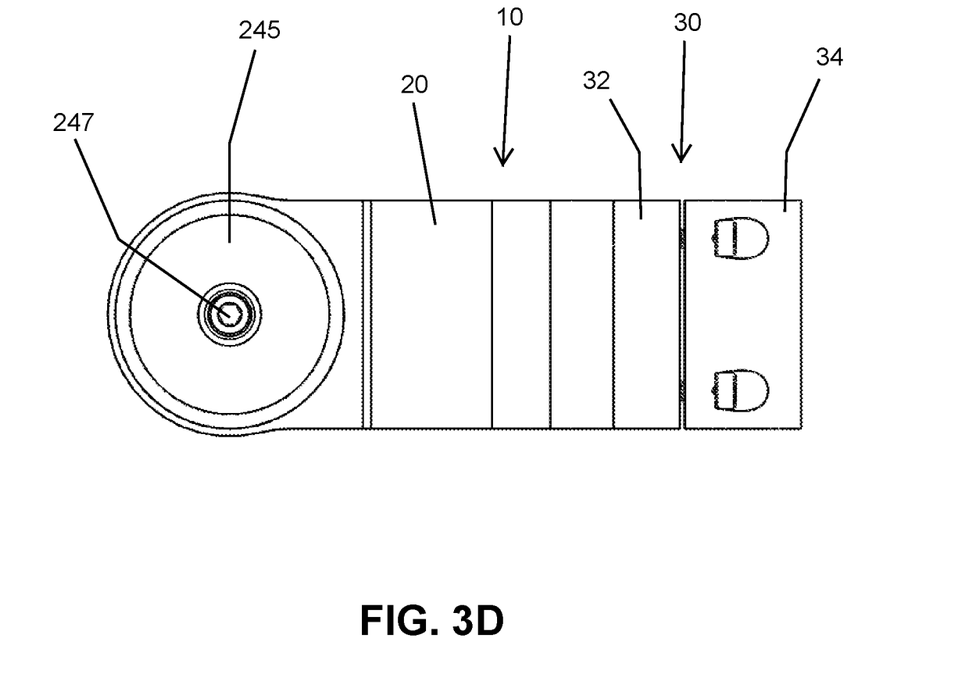
FIG. 3D is a top view of the stem assembly as disclosed in accordance with at least one embodiment of the present invention.

Moreover, in the example, the axis of the opening or channel 35 of the handlebar attachment assembly or clamp 30 is perpendicular to the axis 27 of the steer tube or mounting channel 25, although the two axes do not intersect. In other embodiments or implementations, however, the positional relationship between the two axes, i.e., the axis of the handlebar attachment assembly channel 35 and the axis 27 of the steer tube channel or mounting channel 25, may be different.

Other handlebar attachment assemblies, with different attachment mechanisms, clamps, or sections, is contemplated and is within the full spirit and scope of the present invention. The illustrated handlebar attachment assembly is merely exemplary. In other embodiments, the stem assembly 10 may include integral handlebars 212 or otherwise handlebars 212 that are fixed to the main body 20.

Figure 4A:
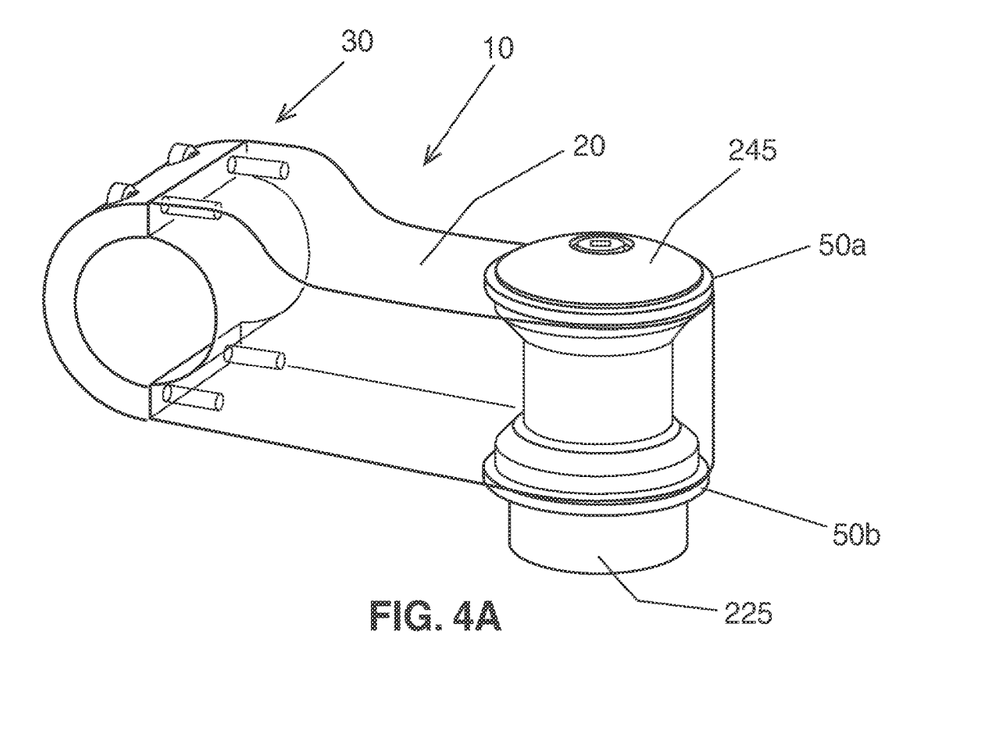
FIG. 4A is a perspective and partially transparent view of the stem assembly as disclosed in accordance with at least one embodiment of the present invention.
Figure 4B:
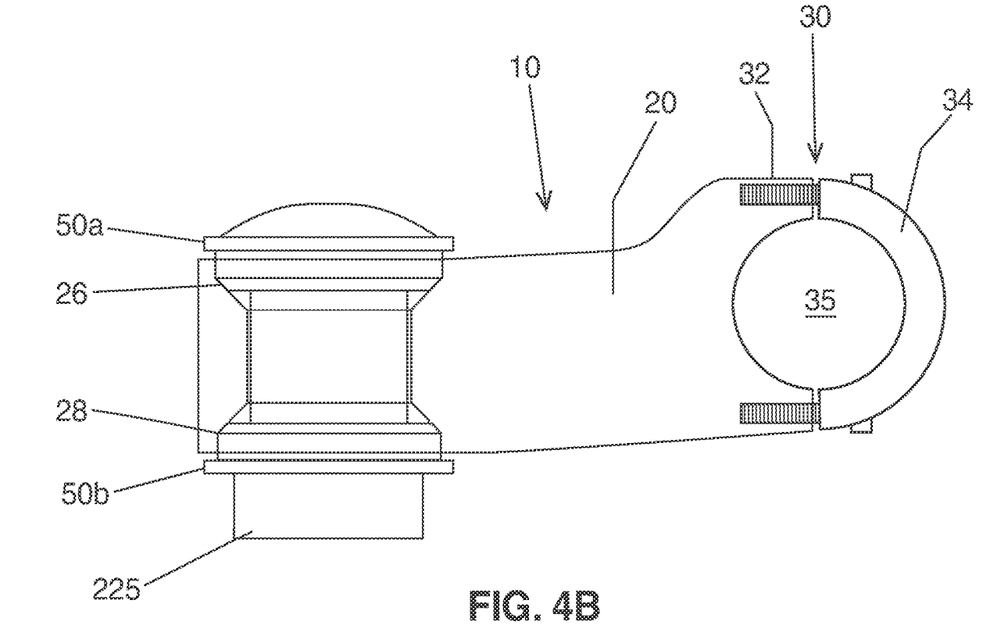
FIG. 4B is a side and partially transparent view of the stem assembly as disclosed in accordance with at least one embodiment of the present invention.
Figure 5:
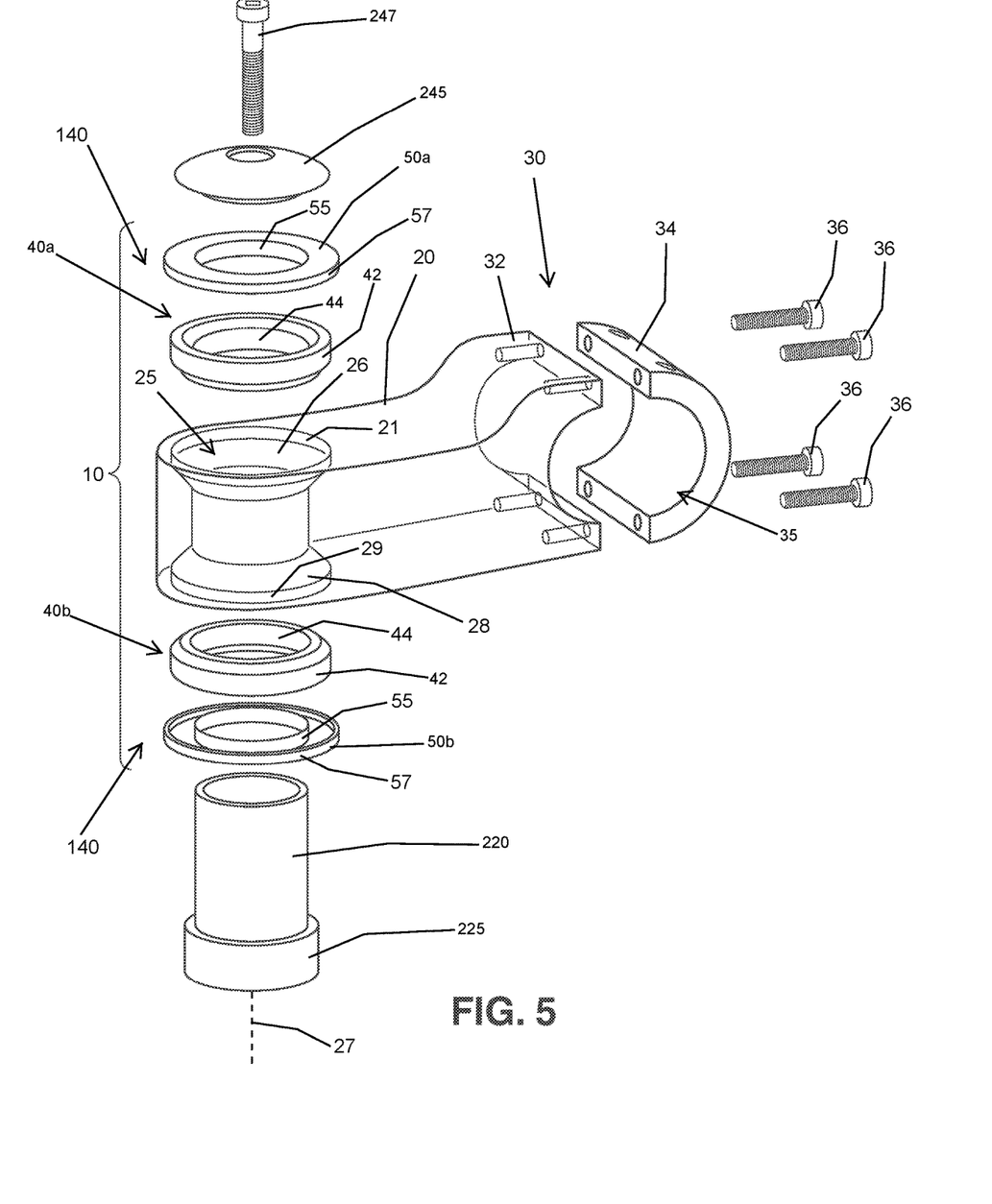
FIG. 5 is an exploded view of the stem assembly as disclosed in accordance with at least one embodiment of the present invention.

Furthermore, the stem assembly 10 of at least one embodiment includes a rotational support assembly, generally referenced as 140, at least partially disposed within the steer tube channel 25, which, in many instances, will come into contact with the steer tube 220 when the stem assembly 10 is installed. More in particular, the rotational support assembly 140 of at least one embodiment of the present invention is structured and disposed to allow rotational movement of the bicycle stem assembly 10, and in particular, the main body 20 thereof, about the steer tube channel axis 27 at least substantially independent of rotational movement of the bicycle steer tube 220. In other words, as the handlebars 212 are rotated or pivoted, the main body 20 of the stem assembly 10 is also rotated or pivoted about axis 27. The rotational support assembly 140 of at least one embodiment minimizes or eliminates that rotational movement of the main body 20 from being imparted to the steer tube 220.

More in particular, it is contemplated that the contact or relationship between the rotational support assembly 140 and the steer tube 220 may not be perfectly frictionless, and thus, in some cases, some rotational movement may be imparted upon the steer tube 220 when the main body 20 and handlebars are rotated or pivoted about axis 27. Thus, the term "at least substantially independent of" rotational movement of the bicycle steer tube 220 is used herein to indicate that while the rotational support assembly 140 of at least one embodiment may in some cases allow the stem assembly 10 to rotate about axis 27 without imparting any movement to the steer tube 220, in other cases, some generally minimal movement may be imparted or translated to the steer tube 220.

Referring now to the exploded view of FIG. 5, in at least one embodiment, the rotational support assembly 140 may include a combination of one or more components, such as, at least one bearing 40a, 40b, and in some case, one or more corresponding pressing rings or compression rings 50a, 50b. More specifically, while two bearings 40a, 40b are shown in the figure, other embodiments may include one bearing or more than two bearings.

In any event, the bearing(s) 40a, 40b of at least one embodiment are rotational or rotary bearings which allow the main body 20 to rotate independent of or at least substantially independent of the steer tube 220. In other words, rotational support assembly 140, such as the bearing(s) 40a, 40b and/or corresponding pressing/compression ring(s) 50a, 50b function to reduce the friction between the stem assembly 10 and the steer tube 220 to reduce, minimize or eliminate rotational movement of the steer tube 220 as the main body 20 of the stem assembly 10 rotates. More specifically, in one exemplary embodiment, the bearing(s) 40a, 40b include an outer surface 42 which contacts, connects to or engages with the main body 20 (either directly or indirectly, e.g., via pressing or compression ring(s) 50a, 50b), and an inner surface 44 which contacts, connects to or engages with the steer tube 220 (either directly or indirectly, e.g., via pressing or compression ring(s) 50a, 50b). The inner and outer surfaces 42, 44 of the bearing(s) 40a, 40b may be separated by balls, spheres, ball bearings, rails, etc. that allow the outer surface 42 to rotate independent of, or substantially independent of, the inner surface 44.

It should be noted that other bearing(s) structured to implement the present invention in the intended manner are contemplated within the full spirit and scope of the present invention. In addition, the rotational support assembly of the present invention may be implemented with other structures or devices in addition to or instead of one or more bearings so long as the main body 20 of the stem assembly 10 rotates independent of or substantially independent of the steer tube 220.

Moreover, in at least one embodiment, the one or more bearings 40a, 40 are coaxial with the steer tube channel 25 such that the bearing(s) 40a, 40b surround and in some cases engage the steer tube 220 (either directly or indirectly, e.g., via pressing or compression ring(s) 50a, 50b). In some embodiments, the bearings 40a, 40b are disposed within the channel 25, for example, as illustrated. For instance, the steer tube channel 25 may include one or more recesses 26, 28 or enlarged portions within which the one or more bearings 40a, 40b are disposed or seated. In one example, the steer tube channel 25 includes a first annular or ring-shaped recess 26 disposed at one end, such as a top or upper end of the channel 25, and a second annular or ring-shaped recess 28 disposed at another end, such as a bottom or lower end of the channel 25. Corresponding bearings 40a, 40b are disposed or seated within the annular recesses 26, 28 in a manner such that the inner surfaces 44 thereof directly or indirectly engage or cooperate with the steer tube 220. Other locations of the recesses 26, 28 are contemplated and are not limited to being disposed at the ends, e.g., at top and bottom ends, of the channel 25. In other words, the one or more recesses and/or the one or more bearings 40a, 40b may be disposed within the inner section of the channel 25, e.g., not at the ends thereof Furthermore, as mentioned above, and still referring to the exploded view in FIG. 5, at least one embodiment includes one or more pressing or compression rings 50a, 50b disposed on and pressed against corresponding bearing(s) 40a, 40b. For example, a first pressing or compression ring 50a is disposed against a first bearing 40a, such as, upon a top surface thereof This pressing or compression ring 50a can function to keep the bearing 40a seated within the corresponding recess 26 and/or allow the bearing 40a to operate as intended and as described herein.

In the embodiment illustrated, a second pressing or compression ring 50b is disposed against a second bearing 40b, such as, upon a bottom surface thereof. This pressing or compression ring 50b can function to keep the bearing 40b seated within the corresponding recess 28 and/or allow the bearing 40b to operate as intended and as described herein.

Furthermore, the pressing or compression rings 50a, 50b each include an inner ledge 55 which wedges at least partially between the inner surface 44 of the corresponding bearing 40a, 40b and the outer surface of the steer tube 220. As shown, the inner ledge 55 is often a straight up-and-down ledge or otherwise parallel to the longitudinal axis 27, although other orientations or angles may also work. In any event, the wedge or contact between the inner ledge 55 and the steer tube 220 can create a non-slip interface or a substantially non-slip interface between the inner surface 44 of the bearing 40a, 40 and the steer tube 220. In this manner, as the outer ring or surface 42 of the bearing rotates (e.g., when the handlebars 212 of the bicycle 200 are turned) rotational movement of the inner surface 44 of the bearing(s) 40a, 40b and the steer tube 220 is eliminated or reduced by virtue of the bearing(s) 40a, 40b and compression rings 50a, 50b.

Similarly, in some embodiments, the pressing or compression rings 50a, 50b may also include an outer ledge 57 which wedges between the outer surface 42 of the corresponding bearing 40a, 40b and an inner surface 21, 29 of the channel 25 and/or corresponding recess 26, 28 thereof. As shown, the outer ledge 57 is often a straight up-and-down ledge or otherwise parallel to the longitudinal axis 27, although other orientations or angles may also work. In any event, the wedge or contact between the outer ledge 57 and the channel 25 or recess(es) 26, 28 can create a non-slip interface or a substantially non-slip interface between the outer surface 42 of the bearing 40a, 40b and the channel 25 or recess(es) 26, 28.

It should also be noted that the pressing or compression rings 50a, 50 can function as a dust cap or end cap which can prevent or minimize particles such as dirt or sand, as well as moisture, from entering into or contacting the corresponding bearings 40a, 40b.

Moreover, as shown, the pressing ring(s) or compression rings 50a, 50b, bearing(s) 40a, 40b, and recesses 26, 28 of at least one embodiment are all coaxial with the steer tube channel 27 to allow the steer tube 220 to be axially disposed therein. As shown the steer tube 220 may, for example, include one or more spacers 225 which in some embodiments may be sandwiched or engaged by and between the head tube 215 and the stem assembly 10, e.g., the bottom end cap or press ring 50b.

Additionally, in some embodiments, with the stem assembly 10 installed or disposed upon the steer tube 220, a top cap 245 may be attached or secured to the bicycle via one or more fasteners 247.

Figure 6:
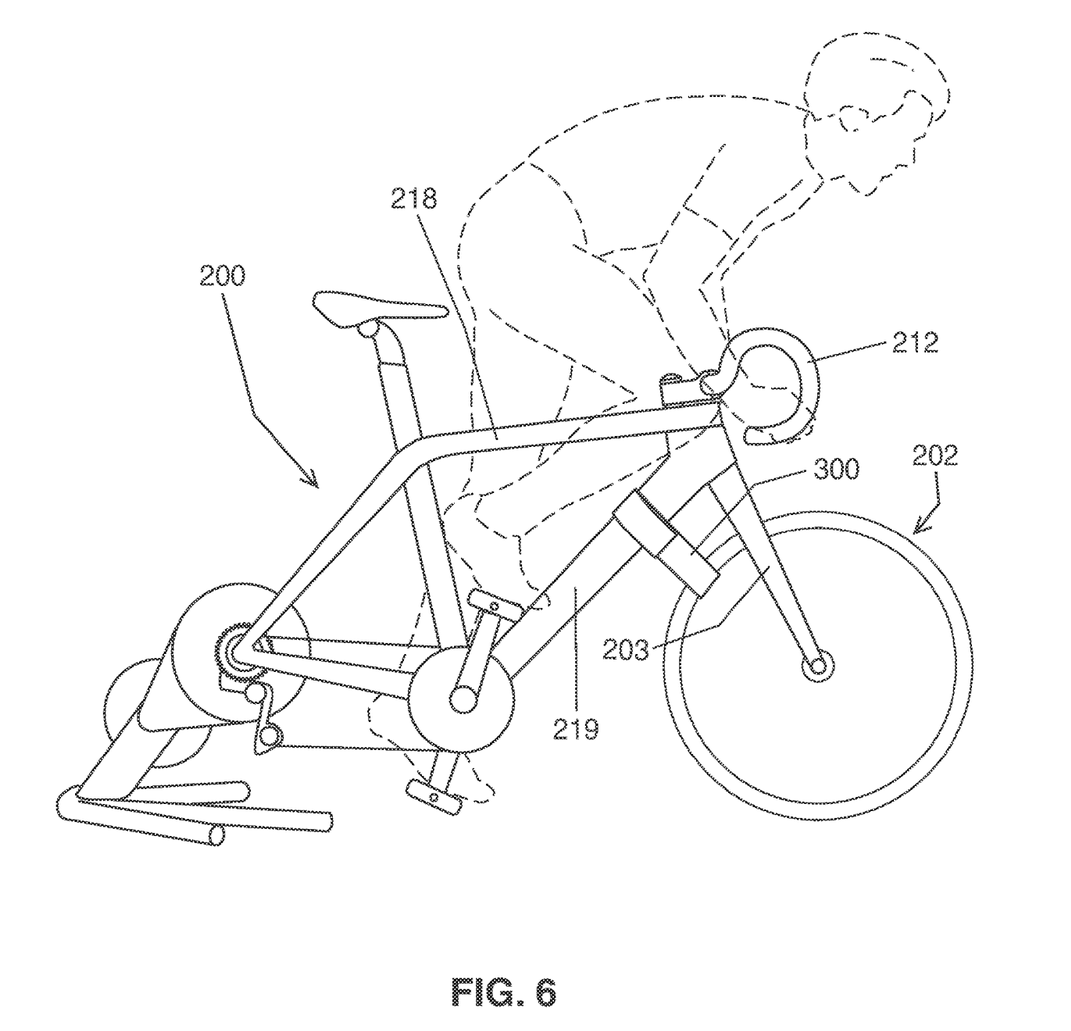
FIG. 6 is a side view of a bicycle with the stem assembly of at least one embodiment installed and with a stabilizing strap secured to the front wheel.

Furthermore, with reference to FIG. 6, in yet another embodiment, a stabilizing device or strap 300 may be used to ensure the front wheel 202 of the bicycle 200 remains in a constant or substantially constant position, even as the handlebars 212 and stem assembly 10 of the present invention rotate. More specifically, the stabilizing device 300 may include a strap that is threaded or otherwise disposed through the front wheel 202 and is secured over and/or around a portion of the bicycle frame, such as, but not limited to the down tube 219 of the bicycle frame, as illustrated in FIG. 6. The strap or stabilizing device 300 may secure to other fixed portions of the bicycle, including the top tube 218, for example.

Moreover, the stabilizing device 300 of at least one embodiment may be in the form of an elongated strap with hook and loop fasteners (e.g., VELCRO® fasteners) that allows the length of the secured strap to be adjusted. Other fasteners, such as snaps, hooks, buttons, etc. can be used to secure the device in place. It should be noted that the stabilizing device 300 or strap can be secured to other nearby and stationary structures, for example, in the room, in that it does not necessarily need to secure to the bicycle 200 to maintain the front wheel 202 in a steady or constant position. In addition, other stabilizing devices 300 or structures that function to maintain the front wheel 202 in a steady or constant position can be used, including wheel stands, one or more blocks or bricks, etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. A bicycle stem comprising:
a main body, said main body comprising a first end defining a steer tube channel disposed through the main body and a second end defining a handlebar attachment assembly, said handlebar attachment assembly being configured to engage a handlebar structure, said steer tube channel being configured to receive a bicycle steer tube therein, and
a rotational support assembly disposed at least partially within said steer tube channel and in a contacting relation with the bicycle steer tube disposed therein,
said rotational support assembly further comprises at least one bearing coaxially disposed within said steer tube channel to allow rotational movement of said bicycle stem about an axis of said steer tube channel at least substantially relative to the bicycle steer tube.

2. The bicycle stem as recited in claim 1 wherein said rotational support assembly further comprises at least one compression ring disposed against an end of said at least one bearing.

3. The bicycle stem assembly as recited in claim 2 wherein said at least one compression ring comprises an inner wedge surface disposed at least partially between an inner surface of said at least one bearing and an outer surface of the bicycle steer tube.

4. The bicycle stem as recited in claim 1 wherein said main body comprises at least one annular recess disposed on one end of said steer tube channel, said at least one bearing being disposed at least partially within said at least one annular recess.

5. The bicycle stem as recited in claim 4 further comprising at least one compression ring axially aligned with and disposed against said at least one bearing.

6. The bicycle stem as recited in claim 1 wherein said at least one bearing comprises a first rotary bearing and a second rotary bearing each coaxially disposed within said steer tube channel.

7. The bicycle stem as recited in claim 6 wherein said steer tube channel comprises a first annular recess and a second annular recess, wherein said first annular recess and said second annular recess are coaxial.

8. The bicycle stem as recited in claim 7 wherein said first rotary bearing is disposed within said first annular recess and said second rotary bearing is disposed within said second annular recess.

9. The bicycle stem as recited in claim 8 wherein said first annular recess is disposed at a first, upper end of said steer tube channel and wherein said second annular recess is disposed at a second, lower end of said steer tube channel.

10. The bicycle stem as recited in claim 9 further comprising a first pressing ring axially aligned with and disposed against said first rotary bearing.

11. The bicycle stem as recited in claim 10 wherein said first pressing ring comprises an inner wedge surface disposed at least partially between an inner surface of said first rotary bearing and an outer surface of the bicycle steer tube.

12. The bicycle stem as recited in claim 11 further comprising a second pressing ring axially aligned with and disposed against said second rotary bearing.

13. The bicycle stem as recited in claim 12 wherein said second pressing ring comprises an inner wedge surface disposed at least partially between an inner surface of said second rotary bearing and the outer surface of the bicycle steer tube.

14. A bicycle stem assembly mountable to a bicycle steer tube, said bicycle stem assembly comprising:
a main body,
a mounting channel disposed through said main body,
a rotational support assembly disposed at least partially within said mounting channel, said rotational support assembly being structured to allow rotational movement of said bicycle stem about an axis of said mounting channel and at least substantially relative to the bicycle steer tube, and
said rotational support assembly comprising at least one bearing disposed within said mounting channel and at least one compression ring disposed against an end of said at least one bearing.

15. The bicycle stem assembly as recited in claim 14 wherein said at least one bearing comprises a first bearing and a second bearing coaxially disposed within said mounting channel.

16. The bicycle stem assembly as recited in claim 15 wherein said at least one compression ring comprises a first compression ring axially disposed against an end of said first bearing and a second compression ring coaxially disposed against an end of said second bearing.

17. The bicycle stem assembly as recited in claim 16 wherein said mounting channel comprises a first annular recess and a second annular recess, said first bearing being seated within said first annular recess and said second bearing being seated within said second annular recess.

18. The bicycle stem assembly as recited in claim 14 wherein said at least one bearing of said rotational support assembly allows unbiased clockwise and counterclockwise rotational movement of said bicycle stem.

* * * * *